(12) United States Patent
Bergeron et al.

(10) Patent No.: US 10,743,095 B1
(45) Date of Patent: Aug. 11, 2020

(54) CONTEXTUAL AUDIO SYSTEM

(71) Applicant: Apple Inc., Cupertino, CA (US)

(72) Inventors: Kathleen A. Bergeron, Los Gatos, CA (US); Jay K. Blahnik, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/360,303

(22) Filed: Mar. 21, 2019

(51) Int. Cl.
- *H04R 1/10* (2006.01)
- *H04W 4/029* (2018.01)

(52) U.S. Cl.
CPC .......... *H04R 1/1041* (2013.01); *H04W 4/029* (2018.02)

(58) Field of Classification Search
CPC .............................. H04R 1/1041; H04W 4/029
See application file for complete search history.

(56) References Cited

U.S. PATENT DOCUMENTS

| | | | |
|---|---|---|---|
| 8,320,824 B2 | 11/2012 | Banks et al. | |
| 9,232,335 B2 | 1/2016 | Carlsson et al. | |
| 9,288,597 B2 | 3/2016 | Carlsson et al. | |
| 9,377,941 B2 | 6/2016 | Nguyen et al. | |
| 9,560,449 B2 | 1/2017 | Carlsson et al. | |
| 9,949,054 B2 | 4/2018 | Kadri et al. | |
| 9,961,480 B2 | 5/2018 | Hutchings et al. | |
| 10,158,946 B2 | 12/2018 | Hammer et al. | |
| 2006/0064730 A1 | 3/2006 | Rael et al. | |
| 2007/0037605 A1* | 2/2007 | Logan | G08B 13/1427 455/567 |
| 2013/0051572 A1 | 2/2013 | Goh et al. | |
| 2014/0253319 A1* | 9/2014 | Chang | H04M 1/72522 340/521 |
| 2015/0111558 A1* | 4/2015 | Yang | G04G 21/04 455/418 |
| 2016/0036953 A1* | 2/2016 | Lee | H04M 1/7253 455/426.1 |
| 2016/0284200 A1* | 9/2016 | Song | G06F 3/03546 |
| 2016/0360018 A1* | 12/2016 | Watson | H04M 1/6066 |
| 2017/0212479 A1* | 7/2017 | Kwon | G04R 60/10 |
| 2018/0122025 A1* | 5/2018 | Boesen | G06Q 50/18 |
| 2019/0090135 A1* | 3/2019 | Milevski | H04W 12/08 |

* cited by examiner

*Primary Examiner* — Simon King
(74) *Attorney, Agent, or Firm* — Brownstein Hyatt Farber Schreck, LLP

(57) ABSTRACT

A contextual audio system configured to adjust audio playback in response to positional data. The contextual audio system may include a wearable audio device and, optionally, a sensing device. In some embodiments, the sensing device and the wearable audio device are the same. Generally, the contextual audio system employs different types of data to determine a user's location and/or activity (both of which are examples of "context") and adjust audio output of the wearable audio device portion of the system.

19 Claims, 11 Drawing Sheets

CONTEXTUAL AUDIO SYSTEM

FIELD

The described embodiments relate generally to adjusting audio output of a wearable audio device based on a context of a user, such as a location. More particularly, the present embodiments relate to a wearable audio device in communication with a sensing device; the devices may use positional data and other data to adjust audio output from the wearable audio device to enhance a user's safety or direct a user's attention.

BACKGROUND

Recent advances in portable computing have provided users with an unprecedented amount of content to consume in nearly any setting. Wearable electronic devices, such as earbuds, headphones, glasses, and the like provide audio to a user substantially wherever or whenever he or she may be. While this facilitates user choice, it has the unintended side effect of often consuming a user's attention, or otherwise distracting him or her, in some situations. This may impact a user's safety as well as the safety of those around her.

SUMMARY

Some embodiments described herein take the form of a contextual audio system, comprising: a wearable audio device, comprising: an audio output structure; and a receiver; and a sensing device, comprising: a transmitter in communication with the receiver; and a position sensor configured to receive positional data; wherein: at least one of the wearable audio device or the sensing device is configured to adjust audio output from the audio output structure in response to the positional data.

Still other embodiments take the form of a method for operating a contextual audio system, comprising: receiving positional data for a sensing device of the contextual audio system; determining the sensing device's location from the positional data; determining that the location is one where a user should be alert; and in response to determining that the location is one where the user should be alert, adjusting an audio output of a wearable audio device of the contextual audio system.

Yet other embodiments take the form of a contextual audio system, comprising: a pair of earbuds; and a smart watch in wireless communication with the pair of earbuds; wherein: the pair of earbuds is configured to provide audio output to a user; the smart watch is configured to determine a location of the user; the smart watch is further configured to execute an application; the smart watch is configured to determine whether the pair of earbuds is to adjust its audio based on the location of the user and the application; the smart watch is configured to provide an instruction to the pair of earbuds to adjust its audio output; and the pair of earbuds is configured to adjust the audio output in response to the instruction from the smart watch.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
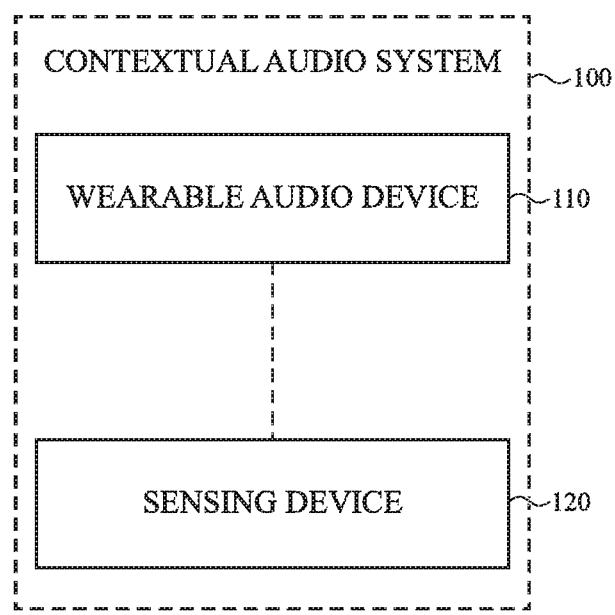
FIG. 1 depicts a sample contextual audio system.

Embodiments described herein generally take the form of a contextual audio system configured to adjust audio playback in response to positional data. The contextual audio system may include a wearable audio device and, optionally, a sensing device. In some embodiments, the sensing device and the wearable audio device are the same. Generally, the contextual audio system employs different types of data to determine a user's location and/or activity (both of which are examples of "context") and adjust audio output of the wearable audio device portion of the system.

"Positional data," as used herein, generally refer to data about a user's (or device's) location, motion, speed, acceleration, weight distribution, balance, or other spatial location and/or orientation. GPS positioning, travel speed, facing, proximity to objects or places, posture, language selected on an electronic device (insofar as that language may provide suggestion or indication as to a user's native country), location relative to an object, and so on are all non-comprehensive examples of positional data.

As one example embodiment, the contextual audio system may employ positional data sensed by a wearable electronic device or other electronic sensing device, optionally coupled with secondary data sensed or received by the wearable electronic device or sensing device, to control audio output to a user. The audio may be outputted by the wearable electronic device to the user's ears. Examples of controlling audio output include: adjusting audio volume; stopping or preventing audio from playing; providing feedback, directions, encouragement, advice, safety information, instructions, and the like; and so on. In some embodiments, the positional data may be GPS data received by either the wearable audio device or a sensing device, and in some embodiments the wearable audio device may be "stand alone" insofar as the sensing device may be omitted (or incorporated into the wearable audio device).

As another example embodiment of a contextual audio system, headphones, earphones, earbuds, or the like (collectively referred to as a "wearable audio device") may be in wired or wireless electronic communication with a second electronic device, such as a smart telephone, watch or other wearable electronic device (e.g., glasses, clothing, jewelry, or the like), tablet computing device, portable media player, computer, and so on. The second electronic device may incorporate, include, or embody one or more sensors configured to sense positional data. The second electronic device, and any electronic device incorporating, including, and/or embodying such a sensor or sensors, is referred to herein as a "sensing device." It should be appreciated that the wearable audio device may be a single unit (as in the case of most headphones) or include multiple elements (as in the case of most wireless earbuds).

Continuing the example, the sensing device may receive positional data, such as GPS data, indicating a position of a user holding or carrying the sensing device. Further, the wearable audio device may incorporate one or more sensors configured to determine whether the wearable audio device is on, adjacent, or inserted into an ear, or are otherwise worn in a position to provide audio to a user, all of which are examples of "wearable data." The sensing device may receive the wearable data from the wearable audio device and use it in conjunction with the positional data to modify audio outputted by the wearable audio device.

As one non-limiting example, the sensing device may determine that the wearable audio device engages both ears and that the user is at a side of, or on, a road. The sensing device may pause or prevent audio playback through the speaker adjacent, within, or otherwise associated with the user's left ear. In some embodiments, audio outputted by the wearable audio device to the user's right ear may be unaffected. This may permit a user to hear traffic while still listening to audio from the wearable audio device, for example. Audio to the left ear may be stopped, muted, or lowered as people typically walk with their left side toward the road.

In some embodiments, the sensing device may receive speed (velocity) data or may interpolate a user's speed based on changes in position data over time. Audio may be paused, stopped, muted, or the like only when the user's speed is above or below a threshold, or between two thresholds. As yet another example, a user's speed may suggest he or she is traveling on a bicycle and audio to the user's ear may be paused, stopped, muted, or changed in volume (all of which are encompassed in the term "adjusted") accordingly. When the user stops, unadjusted audio playback may resume.

Further, changes in position data may also indicate a direction of motion. The direction of motion may be used with the position data to determine which audio output (e.g., left or right ear audio) should be adjusted, as described above. For example, if positional data indicates a user is at or moving along a side of, or on, a road, the sensing device or wearable audio device may adjust audio output as described above. However, the ear to which audio output is adjusted may be determined from the user's direction of motion. The direction of motion may indicate a user is moving along a shoulder of a road with his or her right side toward the road (presuming the user is walking forwards). Thus, audio output to the right ear may be adjusted. If the motion data suggests the user is walking with his or her left side towards the road, audio output to the left ear may be adjusted.

In still other embodiments, the sensing device and/or wearable audio device may be configured to execute a program, operation, application, or the like associated with a particular activity. For example, a jogging application may track the user's distance traveled, route, and/or other information. In some embodiments the sensing device and/or wearable audio device may only adjust audio output to a user at certain points along the route, as tracked by an application program, operation, or the like; the term "application," as used herein, encompasses all of the foregoing. As another option, the application may also track when and/or where audio is adjusted. As still another option, audio may be adjusted only if the application is active. As still another option, the type of adjustment to audio may vary with what application is active or otherwise being executed.

As a specific example of the foregoing, a sensing device may execute a cycling workout application. Positional data gathered by sensors in the sensing device may indicate the user's location when the application is opened. Further, the positional data may indicate which side of a road (or other hazard) a user is on or near. These factors, optionally along with motion data, may be used to determine which of the user's ears faces the road. The sensing device and/or wearable audio device may then adjust the volume of the user's ear facing the road while leaving volume to the other ear unadjusted.

In some embodiments, audio may be outputted only if a sensor in the wearable audio device indicates an ear is unobstructed by the wearable audio device, e.g., the wearable audio device is not in or on the user's ear. Thus, rather than adjusting audio to one ear and playing unadjusted audio to the other ear, audio may not play at all unless the "correct" ear is uncovered or otherwise not in contact with the wearable audio device. The "correct" ear may be the ear closest to a road or other hazard, as determined by the sensing device or wearable audio device in the various manners described herein.

Other embodiments may be used to determine or monitor a user's balance, position, compliance with an exercise program, location, posture, activity, or the like, and adjust audio accordingly. Adjusting audio may include any alterations to audio discussed above as well as providing audible coaching, feedback, encouragement, corrections, suggestions, or the like.

FIG. 1 depicts a sample contextual audio system 100, including a wearable audio device 110 and a sensing device 120. The wearable audio device 110 may be any worn device that outputs audio to the ears of a user, such as headphones, earphones, earbuds, glasses, jewelry, and so on. The sensing device 120 may be any electronic device with one or more sensors capable of sensing positional data. Sample sensing devices may include electronic watches, smart telephones, tablet computing devices, portable computing devices, wearable electronic devices such as glasses, jewelry, clothing, and the like, and so on. In some embodiments, sensing devices are carried or worn by a user, as in the examples given. In other embodiments, sensing devices are removed from or remote from the user; such sensing devices may be stand-alone, incorporated into a vehicle such as a bicycle, car, motorcycle, or the like, positioned within a building or dwelling (such as doorbell cameras, room sensors, and so on), and the like.

Generally, the wearable audio device 110 and the sensing device 120 are in wired or wireless communication with one another. Data and/or commands can pass from one device to another. For example, the wearable audio device 110 may transmit data to the sensing device 120 regarding whether the device is being worn. Likewise, commands to adjust audio output of the wearable audio device 110 may be transmitted from the sensing device 120 to the wearable audio device 110.

In some embodiments, the wearable audio device 110 and the sensing device 120 may be the same device, or may be contained within a single housing or enclosure. In other embodiments, the two are physically separate.

Figure 2:
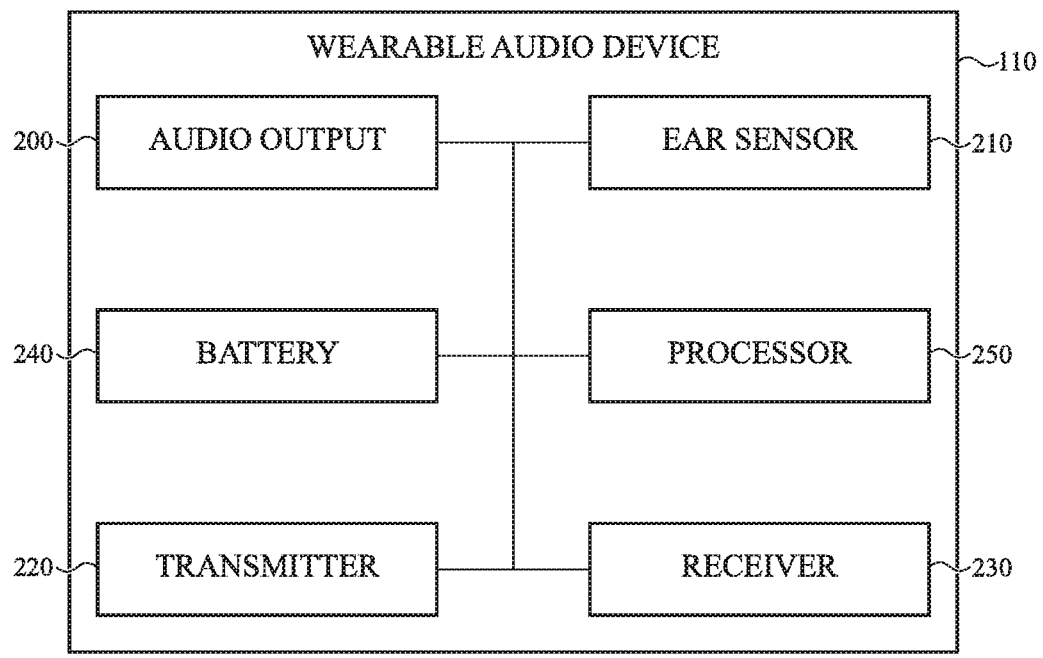
FIG. 2 depicts a sample block diagram of a wearable audio device.

FIG. 2 depicts components of a sample wearable audio device 110. It should be appreciated that the components are illustrative and not exhaustive. Further, some embodiments may omit one or more of the depicted components or may combine multiple depicted components. The wearable audio device 110 may include an audio output structure 200, an ear sensor 210, a transmitter 220, a receiver 230, a battery 240, and/or a processing unit 250, as well as other elements common to electronic devices, such as a touch- or force-sensitive input structure, visual output structure (e.g., a light, display, or the like), an environmental audio sensor, and so on. Each depicted element will be discussed in turn.

The audio output structure 200 may be a speaker or similar structure that outputs audio to a user's ear. If the wearable audio device 110 is a pair of headphones, there are two audio output structures 200, one for each ear. If the wearable audio device 110 is a single earbud, then there is a single audio output structure 200. In the latter case, each earbud may be considered a separate wearable audio device 110 and thus two wearable audio devices may be used by, or included in, certain embodiments. The audio output structure 200 may play audio at various levels; the audio output level may be controlled by the processor 250, as one example.

The ear sensor 210 may be any type of sensor configured to receive or generate data indicating whether the wearable audio device 110 is on, adjacent, and/or at least partially in a user's ear (generally, positioned to output audio to the user's ear). In some embodiments, the wearable audio device 110 may have a single ear sensor 210 configured to provide data regarding whether a single or particular audio output structure 200 is positioned to output audio to the user's ear. In other embodiments, the wearable audio device 110 may have multiple ear sensors 210 each configured to detect the position of a unique audio output structure 200 (for example, where the wearable audio device is a pair of headphones). Sample ear sensors include capacitive sensors, optical sensors, resistive sensors, thermal sensors, audio sensors, pressure sensors, and so on.

The wearable audio device 110 may include a transmitter 220 and a receiver 230. In some embodiments, the transmitter 220 and the receiver 230 may be combined into a transceiver. Generally, the transmitter 220 enables wireless or wired data transmission to the sensing device 120 while the receiver 230 enables wires or wired data receipt from the sensing device 120. The transmitter 220 and the receiver 230 (or transceiver) may facilitate communication with other electronic devices as well, whether wired or wirelessly. Examples of wireless communication include radio frequency, Bluetooth, infrared, and Bluetooth low energy communication, as well as any other suitable wireless communication protocol and/or frequency.

The wearable audio device 110 may also include a battery 240 configured to store power. The battery 240 may provide power to any or all of the other components discussed herein with respect to FIG. 2. The battery 240 may be charged from an external power source, such as a power outlet. The battery 240 may include, or be connected to, circuitry to regulate power drawn by the other components of the wearable audio device 110.

The wearable audio device 110 may also include a processor 250. In some embodiments, the processor 250 may control operation of any or all of the other components of the wearable audio device 110. The processor 250 may also receive data from the receiver 230 and transmit data through the transmitter 220, for example, from and/or to the sensing device 120. The processor 250 may thus coordinate operations of the wearable audio device 110 with the sensing device 120 or any other suitable electronic device. The processor 250, although referred to in the singular, may include multiple processing cores, units, chips, or the like. For example, the processor 250 may include a main processor and an audio processor.

Figure 3:
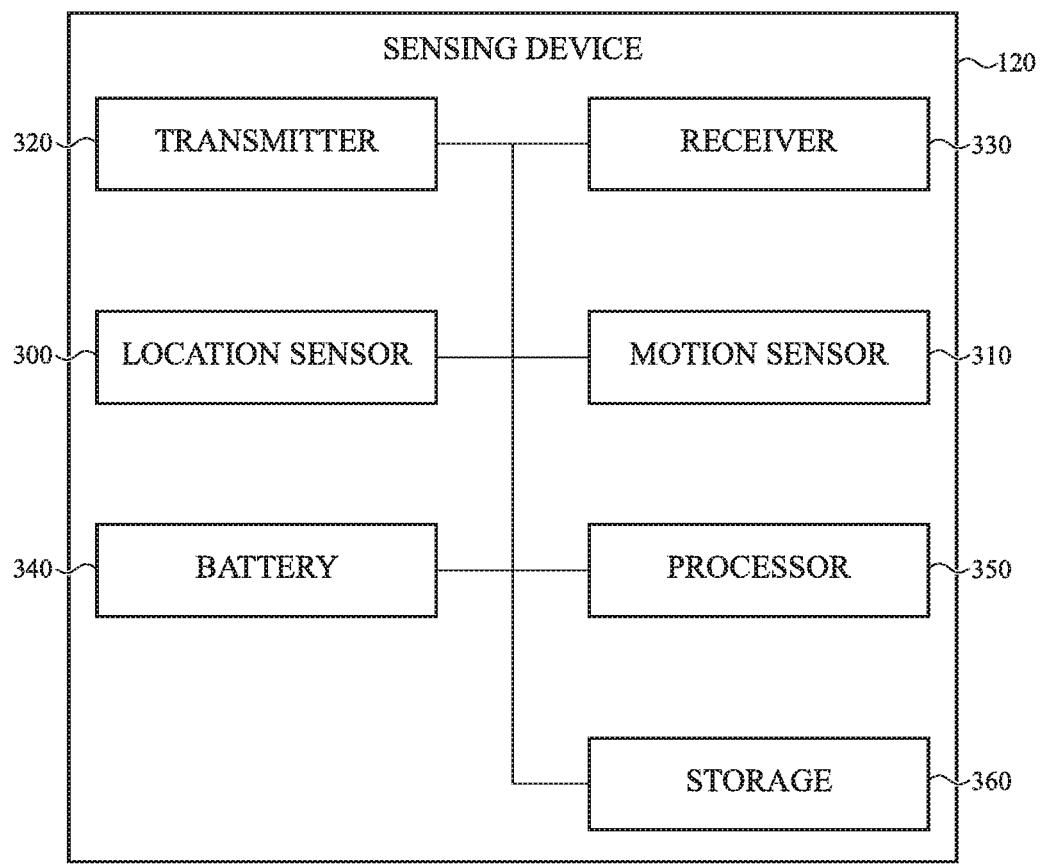
FIG. 3 depicts a sample block diagram of a sensing device.

FIG. 3 is a block diagram showing sample components of an example sensing device 120. As referred to with respect to FIG. 2, the sensing device 120 may include a transmitter 320 in communication with the receiver 230 of the wearable audio device 110, as well as a receiver 330 in communication with the transmitter 220 of the wearable audio device. In some embodiments, a transceiver may replace the separate transmitter 320 and receiver 330. Generally, the transmitter 320 and the receiver 330 cooperate to transmit data and/or instructions to, and receive from, the wearable audio device 110.

The sensing device 120 may also include a position sensor 300. The position sensor 300 may receive data indicating the sensing device's location, either in absolute terms (such as a GPS sensor) or relative terms (such as an optical sensor that may determine the device's location relative to a transmitter or object). Other types of sensors, such as magnetic sensors, ultrasonic sensors, various proximity sensors, and the like may be used as a position sensor 300 in various embodiments. Some wearable audio devices 110 may include multiple position sensors 300. In some embodiments, one or more position sensors 300 may be incorporated into the wearable audio device 110 in addition to, or instead of, in the sensing device 120.

The sensing device 120 may include one or more motion sensors 310 in addition to the position sensor 300. The motion sensor 310 may detect the wearable audio device's motion, or may detect an attribute from which motion may be determined, such as velocity or acceleration. Accelerometers, magnetometers, gyrometers, optical sensors (including cameras), and the like are all examples of motion sensors. The motion sensor 310 may be omitted in some embodiments. Certain embodiments omitting a motion sensor 310 may use data from the position sensor 300 to estimate the sensing device's motion, while others may entirely omit or not use motion data. As one example of estimation motion from the position sensor data, data corresponding to different locations may be received at different times from the position sensor 300. Distance traveled can be estimated from the data. Given estimated distance traveled and the time between measured locations (e.g., the time taken to travel the distance), the sensing device's 120 velocity can be estimated. In some embodiments, one or more motion sensors 310 may be incorporated into the wearable audio device 110 in addition to, or instead of, in the sensing device 120.

The battery 340 may supply power to the other components of the sensing device 120, in a manner similar to that discussed with respect to the battery 240 of the wearable audio device 110. The battery 340 may be recharged from an external power source, as discussed above with respect to the battery 240 of FIG. 2.

The sensing device 120 typically includes a processor 350, which may be similar to, or perform functions similar to, those of the processor 250 discussed with respect to FIG. 2. That is, the processor 350 may control operation of any or all of the other components of the sensing device 120. The processor may also receive data from the receiver 330 and transmit data through the transmitter 320, for example from and/or to the wearable audio device 110. The processor 350 may thus coordinate operations of the sensing device 120 with any other suitable electronic device. The processor 350, although referred to in the singular, may include multiple processing cores, units, chips, or the like.

The storage 360 may be magnetic storage, flash storage, optical storage or any suitable, computer-readable storage mechanism. The storage 360 may store one or more applications that are executed by the processor 350 of the sensing device 120. These applications may enable functionality of the sensing device 120, the wearable audio device 110, or both. As one example, a fitness application may be stored in the storage 360 and executed by the processor 350 to track a user's fitness routine, provide instruction, and the like.

Figure 4A:
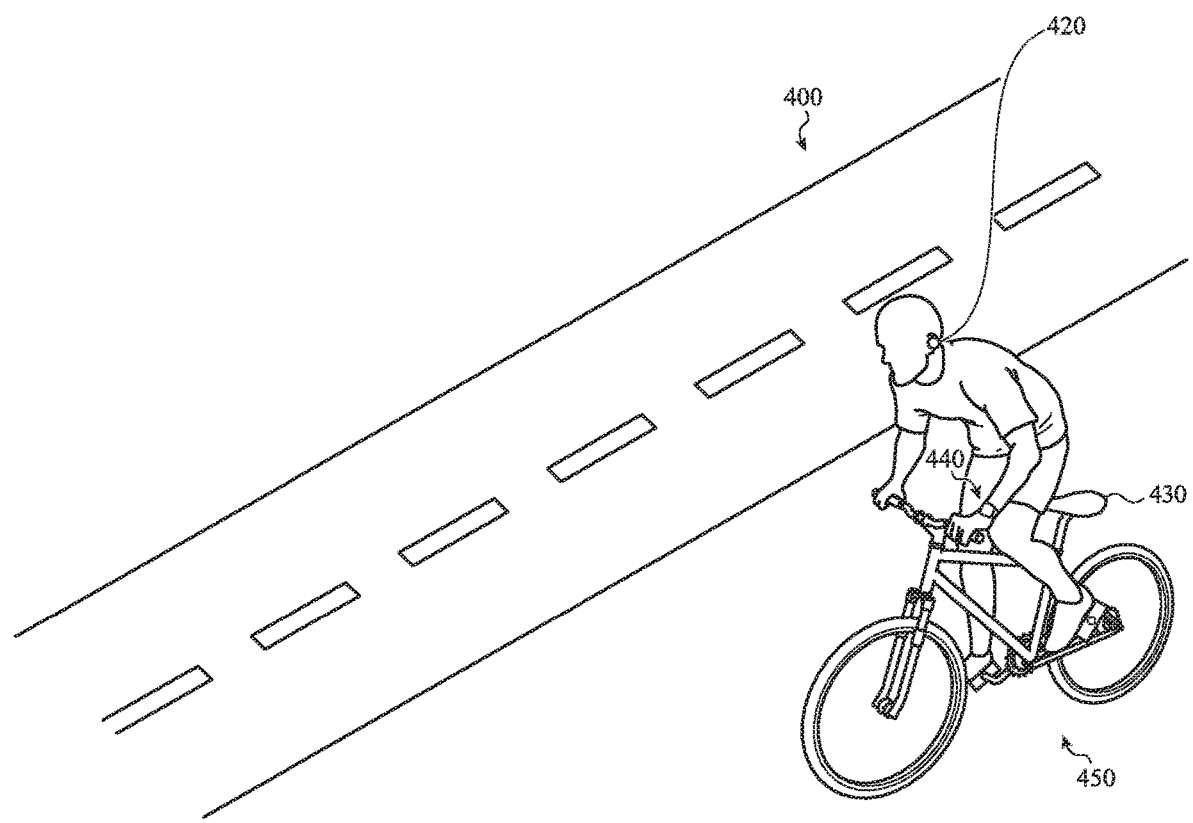
FIG. 4A depicts a sample contextual audio system in use by a user cycling along a road and in a first position.
Figure 4B:
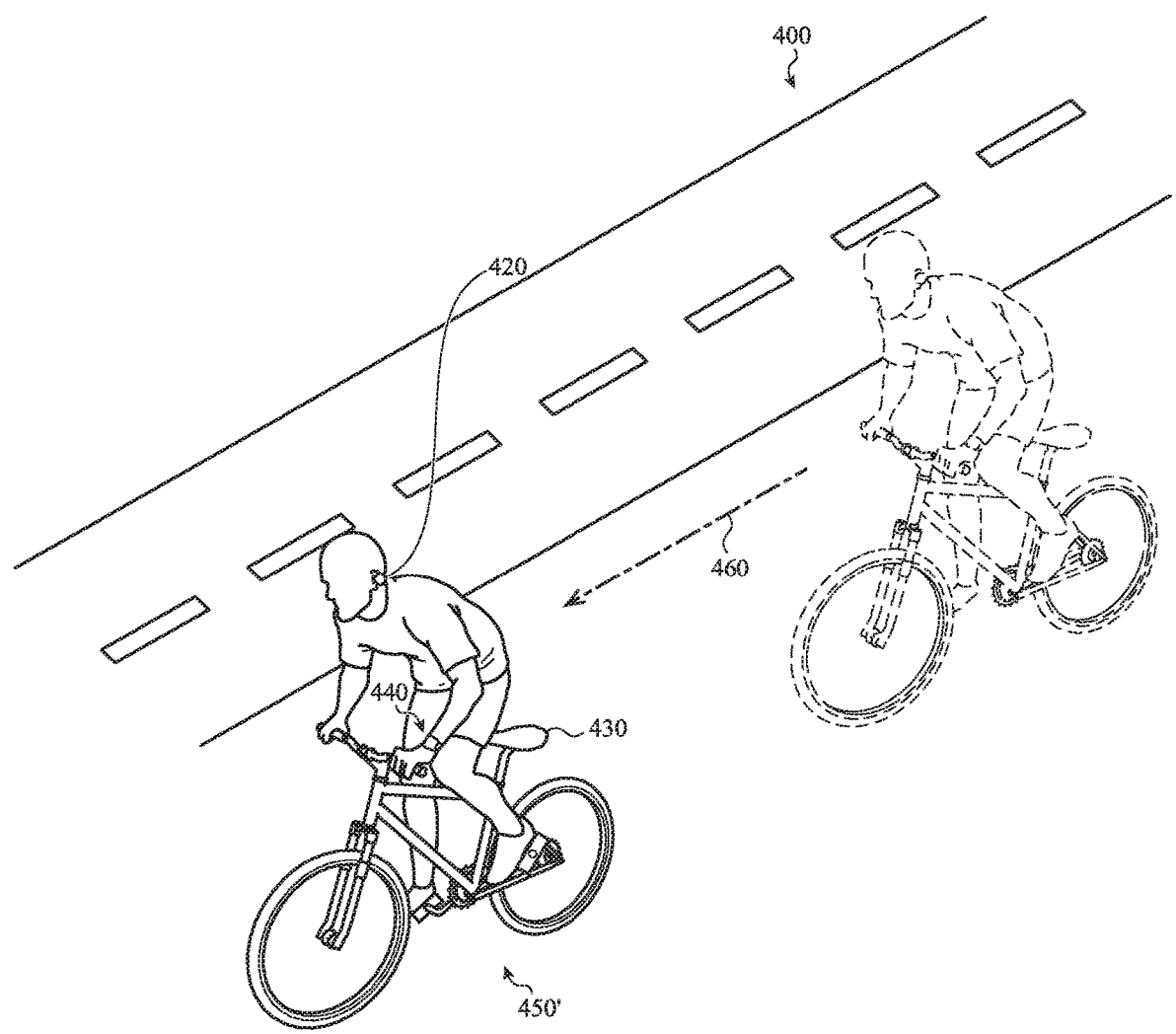
FIG. 4B depicts the sample contextual audio system of FIG. 4A and its user in a second position, while cycling along the road.

FIGS. 4A-4B illustrate one sample contextual audio system in operation in an example environment (here, a road 400). In more detail, FIGS. 4A-4B illustrate one sample embodiment in a sample environment where some combination of positional data, operating data of a sensing device 440 and/or wearable audio device 420, user's travel speed, and/or user's distance traveled, may be used to adjust audio output of the wearable audio device 420. "Operating data" may include data related to applications being executed by the sensing device 440 and/or wearable audio device 420, location of the wearable audio device 420 with respect to the user's ears (e.g., whether the wearable audio device is in or on the user's ears), volume of the audio output, and so on.

A specific example of the contextual audio system's operation will now be discussed. As shown in FIG. 4A, a user 410 may be riding a bicycle 430 along a side of the road 400. The user 410 may be wearing a wearable audio device 420 and a sensing device 440. In this example, the sensing device 440 is an electronic watch and the wearable audio device 420 is a pair of earbuds. As discussed above, the wearable audio device 420 may be in electronic communication with the sensing device 440.

As shown, the user may occupy a first position 450 alongside the road 400. The sensing device 440 (e.g., watch) may acquire positional data, such as GPS data, indicating the user's position 450. Based on this positional data, the sensing device 440 and/or wearable audio device 420 may determine which side of the road 400 the user is on, and thus which ear, and which earbud of the wearable audio device 420, faces the road 400. The wearable audio device 420 may also include one or more sensors that indicate whether the wearable audio device is in, or covers, one of the user's ears, both of the user's ears, or neither of the user's ears.

In some embodiments, the sensing device 440 and/or the wearable audio device 420 may execute an application associated with the user's activity, such as a cycling application, or may play audio associated with a particular activity, such as a cycling playlist. Such applications, audio, and the like may provide additional information regarding the user's action.

Further, as the user 410 moves along the road from a first position 450 (as shown in FIG. 4A) to a second position 450' (as shown in FIG. 4B), the sensing device 440 and/or the wearable audio device 420 may utilize positional data to determine the user's velocity and/or distance traveled 460. Positional data used to determine velocity and/or distance traveled may include GPS data, accelerometer data, magnetometer data, gyroscopic sensor data, and so on.

As the user 410 cycles along the road 400, the embodiment may employ any or all of the positional data, application being executed, audio being played, user's velocity, positioning of the wearable audio device (e.g., whether worn in or on one or both ears) to determine whether to adjust audio output from the wearable audio device 420. For example, a processor of the sensing device 440 may determine that audio should not be played through the wearable audio device 420 while the user 410 is cycling along the road 400 (or is in any location where the user 410 should be alert, whether for his safety, the safety of others around him, or another reason). As yet another option, a processor of the sensing device 440 may determine that audio should not be played through the wearable audio device 420 while the user 410 is cycling along the road and so long as the wearable audio device is inserted into, covers, or is otherwise adjacent to the user's 410 ear facing the road 400. Put another way, the embodiment may determine that audio should not be played by the wearable audio device unless the user's 410 ear that faces the road is unobstructed and cannot hear the audio, thereby increasing the likelihood that the user 410 will hear and be aware of traffic on the road. As yet another example, the embodiment may determine that audio output from the wearable audio device 420 should be adjusted when the user's 410 speed is above a threshold and the user 410 is in a location that suggests or requires audio adjustment, whether for the user's 410 safety, the safety of those around the user 410, or another reason. The location of the user, his or her facing relative to the road, his or her motion or speed, whether a wearable audio device 420 is worn or not, whether vehicles or other people are on or near the road, and the like are all examples of different contexts that may be used by embodiments in determining whether (and how) to adjust audio output.

In any of the foregoing examples, audio adjustment may take the form of lowering or muting a first audio output to the user's 410 ear facing the road while maintaining (e.g., not adjusting) a second audio output to the user's 410 other ear. Alternately, audio adjustment may take the form of adjusting the first and second audio output, either in the same manner or different manners. The first audio output may be paused while the second audio output has its volume lowered, as one example. As another example, the first audio output may be paused or lowered while a warning message plays through the second audio output, reminding the rider to pay attention to traffic on the road. These are two non-limiting examples and are not exhaustive.

Figure 5A:
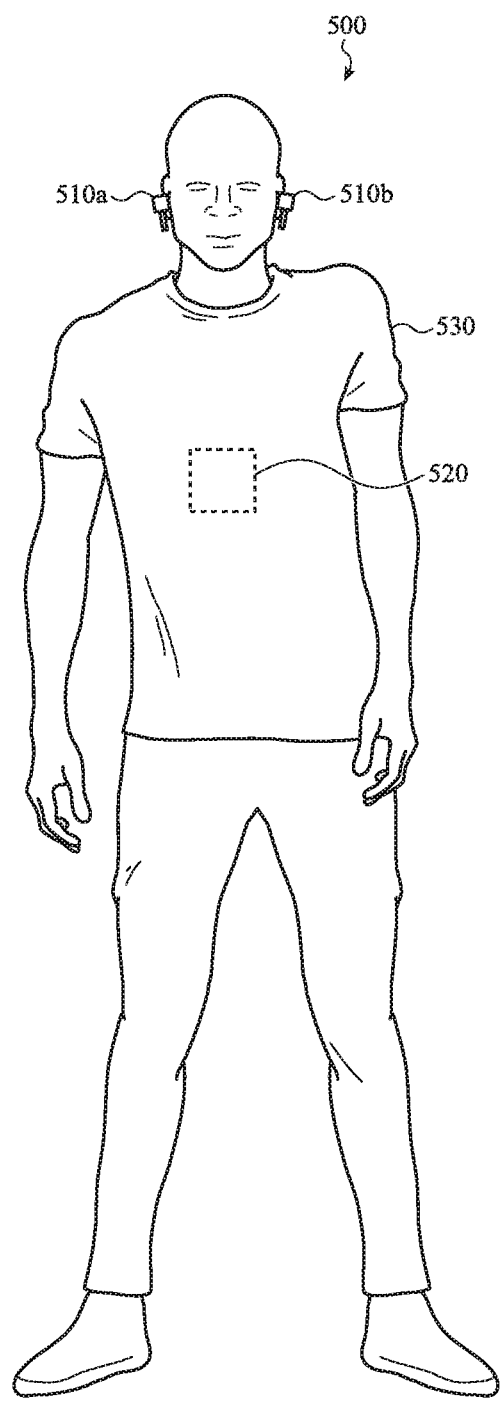
FIG. 5A depicts a user of a contextual audio system leaning to one side.
Figure 5B:
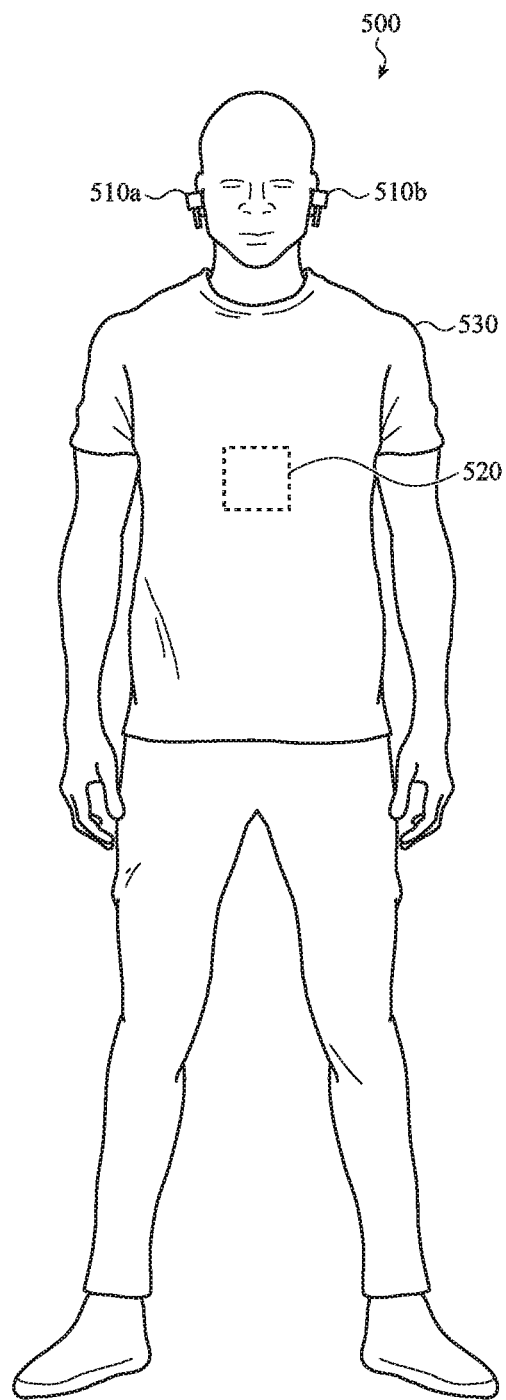
FIG. 5B depicts the user of FIG. 5A standing straight.

Although FIGS. 4A-4B illustrate the contextual audio system as providing feedback while a user rides a bicycle along a road, it should be understood that other embodiments take different forms. For example, the embodiment shown in and described with respect to FIGS. 4A-4B may be configured to operate when a user is running along a road or other location as opposed to cycling. Similarly, FIGS. 5A-5B illustrate a contextual audio system that provides feedback regarding a user's 500 posture as another example. Here, the contextual audio system includes a first and second earbud 510a, 510b (collectively forming a wearable audio device) and a sensing device 520. In this example the sensing device 520 may be incorporated into the user's 500 clothing or may be a separate structure worn or carried by the user 500.

Further, it should be appreciated that the manner in which audio output is adjusted may depend on the location of the user, the wearable audio device, and/or the sensing device. In some locations, embodiments may pause or prevent audio output, while in others audio output may be reduced in volume or played back only through one audio output structure.

As one example, audio may be muted or suspended in locations where a user's attention is necessary, such as hazardous locations, at a job site, in an education facility, and so on. It should be appreciated that audio output may be muted or halted to one or both ears; audio output may be halted or muted to one ear when the user is walking on or along a road or a trail, but may be halted or muted in both ears in a job setting or classroom, by way of example. The relative danger or risk to the user (or to others from the user), as well as the location of such relative risk or danger, also may be a context in determining whether audio output is adjusted to one or both ears. Motion (including speed), applications executing on the wearable audio device or sensing device (or another associated device), user preferences, emergency conditions (such as a flood, accident, dangerous weather, or the like) may also be contexts in adjusting audio output, as well as for which ear or ears audio output is adjusted.

Although operation of embodiments have been discussed in the context of bicycling, it should be appreciated that embodiments may operate generally as described with respect to other vehicles, as well. For example, if positional data and/or motion data from the sensing device 120 determines that a user is in an automobile that has crossed a dividing line of a road or is otherwise incorrectly positioned or located, the embodiment may pause audio output through the wearable audio device 110 in order to bring the user's attention to the vehicle's location. Further, the sensing device 120 may adjust the audio output by playing an audible alert through the wearable audio device 110 rather than muting, pausing, or lowering the volume of the audio output.

FIGS. 5A-5B illustrate another example embodiment of a contextual audio system, in which a sensing device 520 and wearable audio devices 510a, 510b cooperate to determine when audio output is adjusted. FIG. 5A illustrates a user 500 leaning slightly to his right. The user 500 has one wearable audio device 510a in his right ear and a second wearable audio device 510b in his left ear. The user 500 also wears clothing 530 that incorporates a sensing device 520. The sensing device 520 may be woven into the clothing, may be contained within the clothing, or the like. The sensing device 520 may include conductive fabric forming a sensor that is, in turn, connected to an electronic device such as a smart telephone, smart watch, or the like elsewhere on the user's 500 body. Thus, in the embodiment shown in FIGS. 5A-5B, the sensing device 520 may be distributed across different parts or places of a user's 500 body or clothing 530.

In the embodiment of FIG. 5A, the sensing device 520 may be configured to track a location of a user's center or mass or center torso. Likewise, each of the wearable audio devices 510a, 510b may be configured to track or determine their position relative to one another and/or the sensing device 520; they may include position sensors configured for this purpose. Accordingly, the sensing device 520 (or another suitable electronic device in communication with the sensing device and/or wearable electronic devices 510a, 510b) may determine whether the head is centered over the torso by comparing the relative position of the first wearable electronic device, 510a with respect to the sensing device 520, to the second wearable electronic device 510b, again relative to the sensing device 520.

Presuming the location of the sensing device 520 with respect to the center of the user's torso is known, the embodiment may employ the aforementioned relative positions to determine if the user 500 is leaning to one side. In the example of FIG. 5A, the left wearable audio 510b may be slightly closer to the sensing device 520 than the right wearable audio device 510a. Accordingly, the embodiment (and more specifically, one or both of the processors 250, 350, discussed with respect to FIGS. 2 and 3) may determine that the user 500 is leaning to the right.

In response to determining the user 500 is leaning to one side, the embodiment may adjust audio outputted through the audio output structure 200 of one or both of the wearable audio devices 510a, 510b. The adjusted audio may prompt the user 500 to straighten his stance and may provide cues as to which way the user leans, resulting in the user standing straight as shown in FIG. 5B. For example, audio may be muted, paused, raised, or lowered on one side or the other to provide audible feedback to the user regarding his posture. Similarly, audio output may take the form of an instruction ("stop leaning to the right"), encouragement ("you can improve your posture by changing your stance!"), or other audio cue outputted through one or both of the wearable audio devices 510a, 510b. Accordingly, one context used by the contextual audio system when determining how (or whether) to adjust audio output of a wearable audio device 510a, 510b is a position (e.g., stance) of the user.

Figure 6:
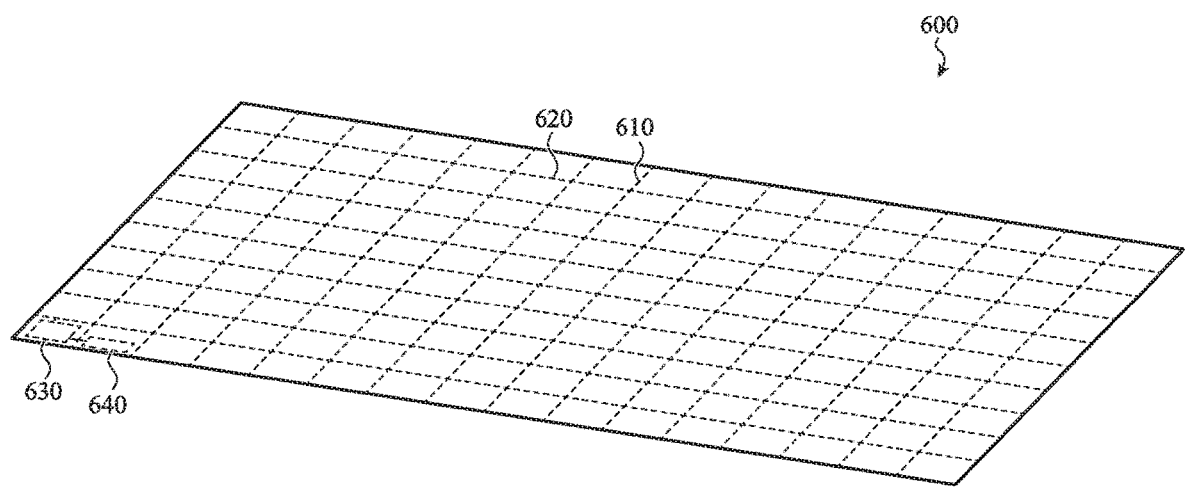
FIG. 6 depicts another embodiment of a sensing device.

FIG. 6 shows a sample workout mat 600 that is one example of a sensing device. Note that, with respect to FIGS. 6-7B, the terms "mat" 600 and "sensing device" are used interchangeably. The mat 600 includes drive lines 610 and sense lines 620 that, taken together, form a set of capacitive force-sensing nodes. These nodes are examples of position sensors 300 as discussed above with respect to FIG. 3. Here, however, the position sensors 300 detect a location of a person standing on the sensing device 600 rather than a location of the sensing device itself. Some embodiments may use resistive sensing nodes, optical sensing nodes, or the like instead of, or in addition to, the capacitive sensing structure discussed with respect to FIGS. 6-7B.

The mat 600 further includes a battery 630 and circuitry 640 configured to control operations of the mat and any associated wearable audio devices, as well as to facilitate communication between the mat and the wearable audio device(s). The circuitry 640 may be any or all of the processor 350, storage 360, transmitter 320, and/or receiver 330 discussed above with respect to FIG. 3.

Figure 7A:
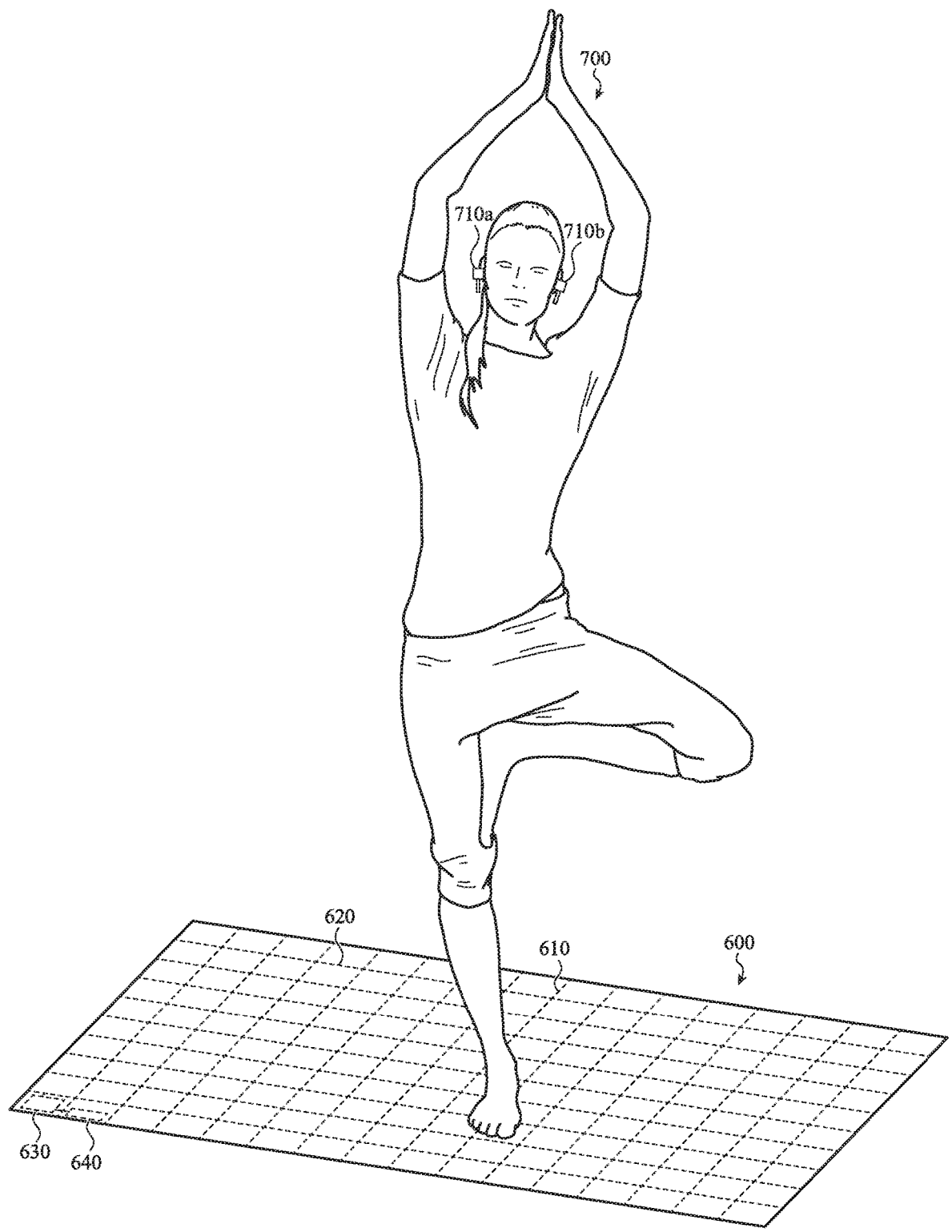
FIG. 7A depicts a user of a contextual audio system off-balance while standing on the sensing device of FIG. 6.
Figure 7B:
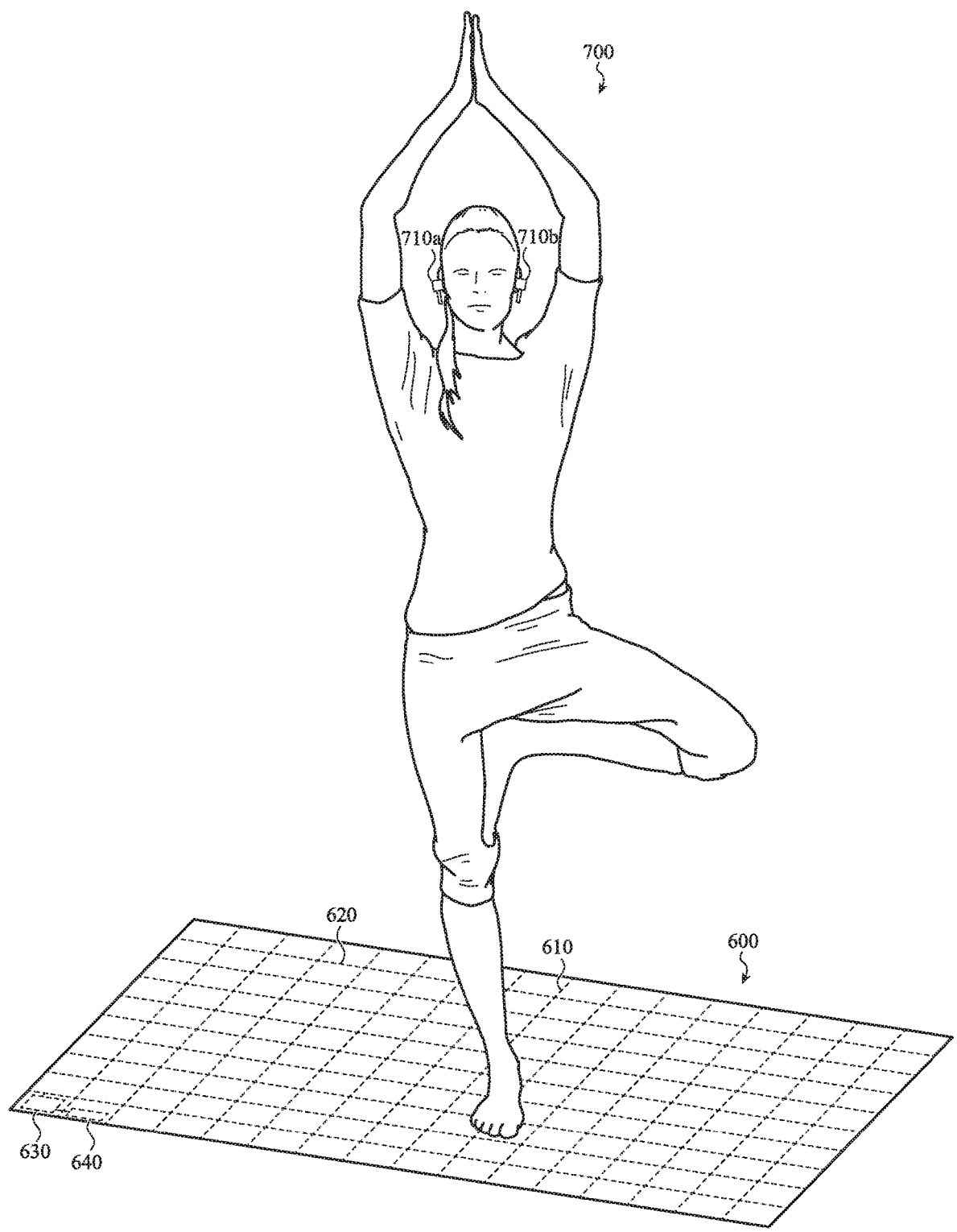
FIG. 7B depicts the user of FIG. 7A standing straight and balanced on the sensing device of FIG. 6.

FIGS. 7A-7B illustrate a user 700 standing on the sensing device 600. The user is wearing a pair of wearable audio devices 710a, 710b, one in each ear. The wearable audio devices 710a, 710b may be in communication with the sensing device (e.g., mat) 600 via the mat's circuitry 640. As show in FIG. 7A, the user may be in a yoga pose but her positioning may be slightly off or otherwise suboptimal for the pose.

Insofar as the user's 700 foot rests on multiple force sensors of the mat 600, the user's weight distribution can be detected. This, in turn, can permit the sensing device 600 to determine or otherwise estimate whether the user 700 is standing leaning to one side while standing on the mat 600 (as shown in FIG. 7A), or standing straight on the mat (as shown in FIG. 7B). Further, the sensing device 600 may transmit a command to adjust audio output of the wearable audio device(s) 510a, 510b in response to determining that the user's weight is improperly distributed (e.g., the user is leaning to one side). Thus, the user's balance and stance are other contexts that may be used by the embodiment to determine whether, and how, to adjust audio output. In some embodiments the mat 600 may transmit force or touch data to the wearable audio devices, which may determine the balance, weight distribution, and/or posture of the user 700, and/or may adjust audio output accordingly.

Although the mat 600 is discussed as incorporating a set of force sensors formed by capacitive drive and sense lines 610, 620, it should be appreciated that discrete force sensors may be employed instead. Likewise, touch sensors may be used instead of force sensors and the area and/or shape of a user's touch on the sensing device 600 may be analyzed to determine weight distribution or posture.

Figure 8:
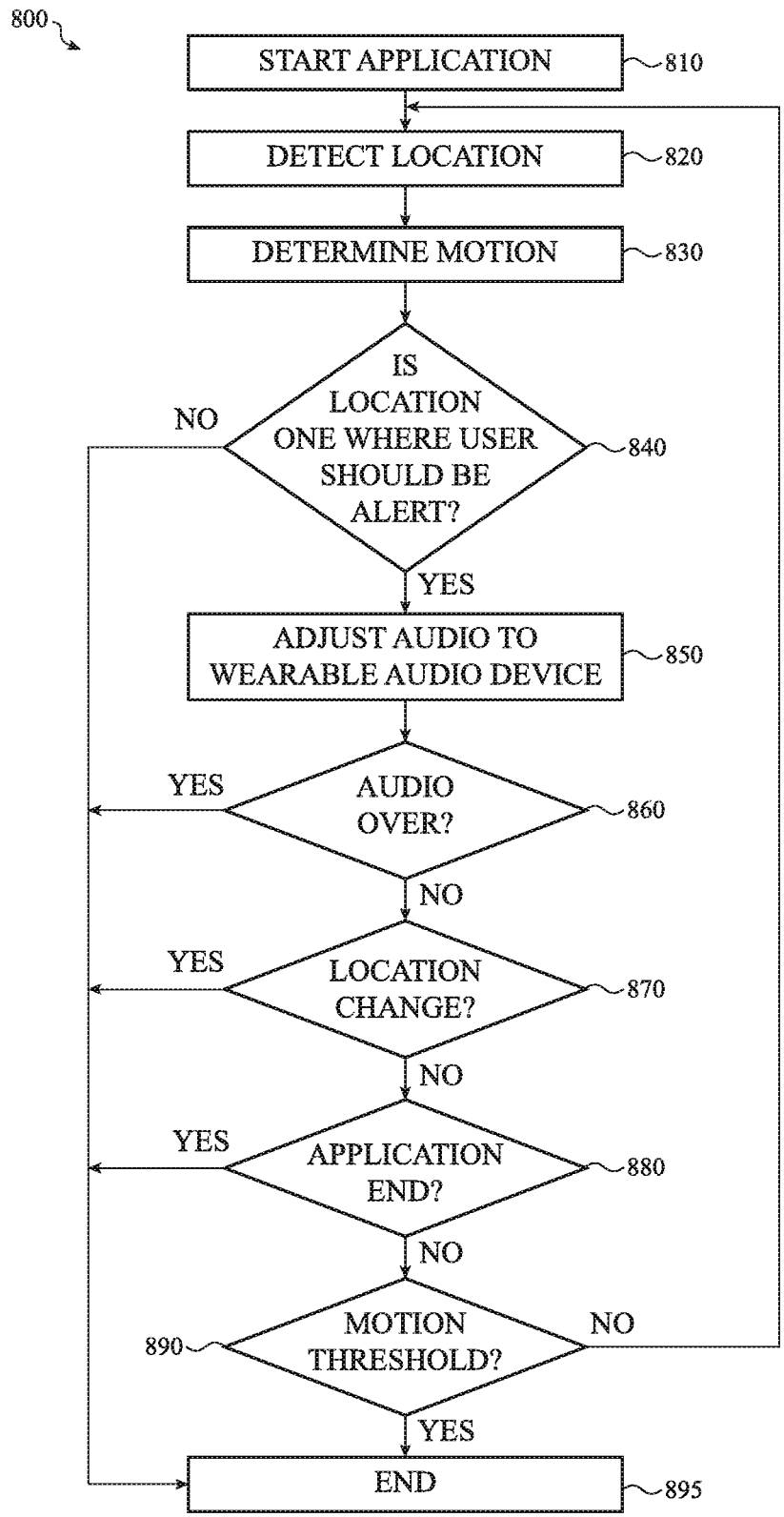
FIG. 8 depicts a sample method of operation for a sample contextual audio system.

FIG. 8 is a flowchart illustrating one sample method 800 for a contextual audio system using a variety of contexts or factors to adjust audio output to a user. It should be appreciated that many of the operations discussed with respect to this figure are optional and may be omitted in some embodiments. Likewise, additional operations may be performed in other embodiments.

The method 800 begins in operation 810, in which an application is started, initiated, executed, or the like on a suitable electronic device. The electronic device maybe a wearable electronic device 110, a sensing device 120, or another electronic device in communication with either or both of the wearable electronic device and sensing device. The application may be an exercise application, a driving application, an application associated with a vehicle, or the like. It should be noted that this operation is optional and may be omitted or ignored in some embodiments.

In operation 820, the embodiment detects a location or otherwise receives positional data. Examples of positional data include: a location of a user, or a device associated with a user, relative to a landmark, object, or the like; an absolute location of a user, or a device associated with a user (such as GPS data or other methods of determining latitude and longitude); a position of a user on an object; a facing of a user or a device associated with a user; a balance of a user; a tilt or angle of a user's body, whether absolute or relative to an object such as a sensing device; and so on. The positional data may be determined by a sensing device 120. In some embodiments, the sensing device 120 may be the wearable audio device 110. Positional data may be supplied by a position sensor 300.

In operation 830, the embodiment determines a user's motion. The user's motion may be determined from motion sensor 310 data or may be determined based on successive sets of positional data from the position sensor 300. Velocity and/or acceleration may likewise be determined in operation 830; the terms "velocity" and "speed" are used interchangeably herein. Operation 830 is optional and may be omitted in some embodiments.

In operation 840, the embodiment determines if the user's location (or other position) is one where the user should be alert or otherwise prompted, whether for the user's safety, the safety of others, to improve the user's performance, or the like. If not, the method 800 ends in end state 895. If so, the method 800 proceeds to operation 850.

In operation 850 the embodiment adjusts audio output from the wearable audio device 110. As discussed elsewhere herein, audio adjust may take the form of stopping, pausing, muting, lowering, or raising an audio output as well as outputting specific feedback, messages, prompts, or the like. Audio output may be adjusted to one or more wearable audio devices 110, again as discussed herein. As one example, audio may be adjusted to one of a pair of earbuds in certain contexts.

In operation 860, the embodiment determines if the audio being outputted is over. If so, the method 800 terminates in end state 895. Otherwise, the method proceeds to operation 870. Operation 860 is optional and may be omitted in some embodiments.

In operation 870, the embodiment determines whether a user's location or other position changes. If not, the method 800 terminates in end state 895. Otherwise the method 800 proceeds to operation 880. Operation 870 is optional and may be omitted in some embodiments.

In operation 880, the embodiment determines if the application initiated in operation 810 has ended. If so, then adjusting the audio output of the wearable audio device 110 is no longer necessary and the method 800 ends at end state 895. Otherwise the method 800 proceeds to operation 890. Operation 880 is optional and may be omitted in some embodiments.

In operation 890, the embodiment determines whether a user's (or a device's) rate of motion is below a threshold. If the velocity is below the threshold, then the method 800 terminates in end state 895. If not, then the method 800 returns to operation 820. It should be appreciated that some embodiments may determine whether velocity exceeds a threshold, in which case the "yes" and "no" branches of the operation 890 may be reversed. In some embodiments, acceleration of a user or device may be analyzed against a threshold rather than velocity.

Generally, operations 860-890 may be performed in any order and the order shown is but one example. Further any or all of these operations may be omitted or skipped by embodiments and any combination of these operations may be executed in various embodiments.

Operations in which the embodiment "determines" an outcome, such as operations 840 and 860-890, may be performed by a processor 250, 350 of the wearable audio device 110 or sensing device 120, or the two in concert. Likewise, various operations may be performed by the components of either or both of the wearable audio device 110 and sensing device 120, as appropriate. In some embodiments one or more operations of the method 800 may be performed by another electronic device in communication with either or both of the wearable audio device and sensing device.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A contextual audio system, comprising:
a wearable audio device, comprising:
an audio output structure;
a receiver; and
a sensor configured to provide a signal indicating whether the wearable audio device is positioned at least partially in an ear of a user; and
a sensing device, comprising:
a transmitter in communication with the receiver; and
a position sensor configured to receive positional data;
wherein:
at least one of the wearable audio device or the sensing device is configured to adjust audio output from the audio output structure in response to the positional data and the signal indicating whether the wearable audio device is positioned at least partially in the ear of the user.

2. The contextual audio system of claim 1, wherein:
the wearable audio device is a first earbud;
the contextual audio system further comprises a second earbud in communication with at least one of the first earbud or the sensing device;

the sensing device is one of a smart watch or a smart telephone;
adjusting the audio output comprises stopping the audio output.

3. The contextual audio system of claim 1, wherein:
the wearable audio device is a first wearable audio device;
the contextual audio system further comprises a second wearable audio device in communication with at least one of the first wearable audio device or the sensing device; and
the audio output is adjusted to the first wearable audio device but not the second wearable audio device.

4. The contextual audio system of claim 1, wherein adjusting the audio output comprises lowering a volume of the audio output.

5. The contextual audio system of claim 1, wherein:
the sensing device further comprises:
  a storage configured to store an application; and
  a processor operably connected to the storage and configured to execute the application; and
the processor is configured to instruct the audio output structure of the wearable audio device to adjust the audio output in response to the positional data and the application.

6. The contextual audio system of claim 5, wherein the processor is configured to instruct the audio output structure of the wearable audio device to adjust the audio output in response to the positional data, the application, and the signal from the sensor.

7. The contextual audio system of claim 5, wherein:
the application is a cycling application; and
the positional data indicates that the sensing device is along a side of, or on, a road.

8. The contextual audio system of claim 1, wherein:
the wearable audio device is an earbud;
the sensing device is a smart watch; and
the communication is a wireless communication.

9. The contextual audio system of claim 1, wherein:
the sensing device is a mat; and
the positional data relates to at least one of a user's balance, weight distribution, or posture.

10. A method for operating a contextual audio system, comprising:
receiving positional data for a sensing device of the contextual audio system;
determining a location of the sensing device from the positional data;
determining that the location is one where a user should be alert;
determining that a wearable audio device of the contextual audio system is positioned to provide an audio output to an ear of the user; and
in response to determining that the location is one where the user should be alert and in response to determining that the wearable audio device is positioned to provide the audio output to the ear of the user, adjusting the audio output of the wearable audio device of the contextual audio system.

11. The method of claim 10, further comprising:
executing an application on the sensing device; wherein:
the operation of adjusting the audio output of the wearable audio device comprises, in response to executing the application and further in response to determining that the location is one where the user should be alert, adjusting the audio output of the wearable audio device.

12. The method of claim 11, further comprising:
determining a motion of the sensing device; wherein:
the operation of adjusting the audio output of the wearable audio device comprises, in response to executing the application, further in response to the motion, and still further in response to determining that the location is one where the user should be alert, adjusting the audio output of the wearable audio device.

13. The method of claim 10, wherein the location is at a side of, or on, a road.

14. The method of claim 10, further comprising:
determining that the user is riding a bicycle based on at least one of motion data or an application being executed; and
adjusting the audio output of the wearable audio device only if the user is riding the bicycle.

15. The method of claim 10, wherein:
the operation of adjusting the audio output of the wearable audio device comprises:
  adjusting a first audio output through a first audio output structure of the wearable audio device; and
  maintaining a second audio output through a second audio output structure of the wearable audio device.

16. The method of claim 10, wherein:
the operation of adjusting the audio output of the wearable audio device comprises:
  adjusting a first audio output through a first audio output structure of the wearable audio device; and
  playing a warning through a second audio output structure of the wearable audio device.

17. A contextual audio system, comprising:
a pair of earbuds; and
a smart watch in wireless communication with the pair of earbuds; wherein:
  the pair of earbuds is configured to provide audio output to a user;
  the smart watch is configured to determine a location of the user;
  the smart watch is configured to execute an application;
  the smart watch is configured to determine whether the pair of earbuds is to adjust its audio based on the location of the user and the application;
  the smart watch is configured to provide an instruction to the pair of earbuds to adjust its audio output; and
  the pair of earbuds is configured to adjust the audio output in response to the instruction from the smart watch.

18. The contextual audio system of claim 17, wherein:
the audio output includes a first audio output and a second audio output;
the pair of earbuds comprises:
  a first audio output structure associated with a first ear of the user and configured to provide the first audio output to the first ear;
  a second audio output structure associated with a second ear of the user and configured to provide the second audio output to the second ear; and
the pair of earbuds is configured to adjust the first audio output while maintaining the second audio output.

19. The contextual audio system of claim 17, wherein:
the pair of earbuds is configured to determine whether a first earbud of the pair of earbuds is at least partially within an ear of the user; and
the smart watch is further configured to provide an instruction to adjust the audio output if the first earbud is at least partially within the ear of the user.

* * * * *